United States Patent
Kneipp et al.

(10) Patent No.: US 6,754,332 B1
(45) Date of Patent: Jun. 22, 2004

(54) OBJECT ORIENTED SYSTEM AND METHOD FOR DIRECTING INCOMING TELEPHONE CALLS

(75) Inventors: Paul Kneipp, Plano, TX (US); B. Scott Smith, Londonderry, NH (US); Judith A. Dunn, Westford, MA (US)

(73) Assignee: Concerto Software, Inc., Westford, MA (US)

( * ) Notice: Subject to any disclaimer, the term of this patent is extended or adjusted under 35 U.S.C. 154(b) by 0 days.

(21) Appl. No.: 09/184,922

(22) Filed: Nov. 2, 1998

(51) Int. Cl.[7] .................. H04M 3/00; H04M 11/00; H04M 3/42; H04M 7/00
(52) U.S. Cl. .............. 379/265.13; 379/93.23; 379/203.01; 379/219
(58) Field of Search .................. 379/265, 203.01, 379/219, 93.23; 370/352, 356, 260

(56) References Cited

U.S. PATENT DOCUMENTS

| | | | |
|---|---|---|---|
| 5,299,260 A | | 3/1994 | Shaio .................. 379/265 |
| 5,309,513 A | | 5/1994 | Rose .................. 379/265 |
| 5,335,269 A | | 8/1994 | Steinlicht .................. 379/266 |
| 5,724,411 A | * | 3/1998 | Eisdorfer et al. ........ 379/93.23 |
| 5,838,665 A | * | 11/1998 | Kahn et al. .................. 370/260 |
| 5,870,464 A | * | 2/1999 | Brewster et al. ............. 379/219 |
| 5,881,144 A | * | 3/1999 | Havens ................... 379/203.01 |
| 6,069,890 A | * | 5/2000 | White et al. ................. 370/352 |
| 6,122,364 A | * | 9/2000 | Petrunka et al. ............. 379/265 |
| 6,167,043 A | * | 12/2000 | Frantz ......................... 370/356 |
| 6,175,564 B1 | * | 1/2001 | Miloslavsky et al. ....... 370/352 |

\* cited by examiner

*Primary Examiner*—Ahmad F. Matar
*Assistant Examiner*—Thjuan P Knowlin
(74) *Attorney, Agent, or Firm*—Bourque & Associates, PA

(57) ABSTRACT

An automatic call distributor (ACD) system, which includes an object-oriented system for defining one or more call treatments is provided. The system includes a first graphical user interface including a plurality of data record fields, which define data applicable to handling an incoming call. Also included is a second graphical user interface, which is configured to accept one or more tests based on the data included in the data record fields applicable to the handling of an incoming call. The first and second graphical user interfaces include a plurality of icons and data entry fields, which are manipulated by a system user to create and modify a call treatment. Once created, call treatments are displayed in a graphical format on a third graphical user interface, which allows one or more portions of a displayed call treatment to be altered by selecting the graphical representation of the relevant portion using a computer mouse or other point and click device.

14 Claims, 6 Drawing Sheets

Called Numbers

| Called Number | Abbrev | Description |
|---|---|---|
| 800-999-4400 | 4400 | Customer A |
| 800-999-4401 | 4401 | Customer B |
| 800-999-4402 | 4402 | Customer C |
| 800-999-4403 | 4403 | Customer D |
| 800-999-4404 | 4404 | Customer E |
| 800-999-4405 | 4405 | Customer F |

Selected Called Number: none

Enter information about the new called number below:

Called Number    Abbreviation    Description

When you have finished, press [Save]

Or, if you wish to discontinue press [Cancel]

OBJECT ORIENTED SYSTEM AND METHOD FOR DIRECTING INCOMING TELEPHONE CALLS

FIELD OF THE INVENTION

The present invention relates generally to automatic call distributor systems and more specifically to an object oriented system and method of creating and modifying call routing parameters.

BACKGROUND OF THE INVENTION

An automatic call distributor (ACD) is a system configured to automatically handle incoming telephone calls. An ACD is designed to efficiently route calls, such as toll-free "800" calls, to call center agents in telemarketing and service inquiry centers. ACD's provide specialized, real-time call management and report generation capabilities. An ACD typically comprises a switching network providing incoming calls with plurality of agents. At certain times, the number of calls received by any given ACD may be excessive. At these times, callers are placed in a line (queue) for answering.

Whenever an incoming call is not immediately answered by a live agent, this call must be handled or routed by the ACD. Call routing strategies and parameters are generally known in the industry as "call treatments". In other words, call treatments are rule sets, which are applied to incoming calls in order to ensure that such incoming calls are efficiently routed to appropriate call center agents or are otherwise handled. There are many ACD systems in existence, which utilize simple and complex call treatment systems and methods. For example, U.S. Pat. No. 5,299,260 to Shaio teaches a system for automatically handling incoming telephone calls, which receives an incoming call and, using a call discrimination sub-system and based on the telephony information, assigns control of the call to one of a plurality of possible application programs. At least one application program includes queries for obtaining further information about the call and returns control of the call to the call discrimination sub-system to reassign the call based on the telephony information and further information. The system selects an application program by comparing telephony information about the call with telephony digit patterns that correspond to different types of telephony information and that have been input by a user to be associated with an application program.

U.S. Pat. No. 5,309,513 to Rose discloses an ACD system, which is configured to receive calls and distribute the calls to the first available qualified agent associated with the ACD. Rose teaches that improved call service can be obtained by selectively assigning telephone calls to different sets of call center agents having different skills.

U.S. Pat. No. 5,335,269 to Steinlicht discloses an additional ACD-type system. Steinlicht teaches that it is often more desirable to direct an incoming call to an immediately available agent who has less than perfect knowledge of the subject matter of the incoming call rather than forcing a caller to wait for the best qualified agent. Thus, Steinlicht offers a computer software-implemented algorithm for placing an incoming call in a plurality of queues and then offering the call to primary and secondary desirability agents in each of the queues in a prescribed order if anyone of these groups of agents has an agent standing by and able to accept a call.

While all these systems effectively route incoming calls in desirable fashions, they all involve sophisticated, pre-programmed decision structures applicable to potential incoming calls. Thus, they must be programmed by persons skilled in the art of computer programming. Also, once the call routing parameters are established, they are not easily altered.

Accordingly, there is a need for an automatic call distributor-type system, that is easily programmable by call center supervisors who are not necessarily skilled in the art of computer programming. There is also a need for an ACD-type system that allows call routing parameters to be easily altered or modified as conditions dictate.

SUMMARY OF THE INVENTION

The disclosed invention satisfies these needs by providing an automatic call distributor (ACD) system, which includes an object-oriented system for defining one or more call treatments. The system includes a first graphical user interface, which includes at least one data record field, which defines at least one parameter applicable to handling an incoming call. Also provided is a second graphical user interface, which is configured to accept at least one test based on the contents of the data record fields applicable to the handling of an incoming call. The first and second graphical user interfaces include a plurality of icons and data entry fields, which are manipulated by a system user to create and modify a call treatment.

Once created, call treatments are displayed on a third graphical user interface in a graphical format. One or more portions of a call treatment may be altered by selecting the graphical representation of the relevant portion using a computer mouse or other point and click device.

Thus, the disclosed invention provides a system and method of creating and modifying call treatments which can be operated by an ACD system supervisor having little or no computer programming skills.

DESCRIPTION OF THE DRAWINGS

These and other features and advantages of the present invention will be better understood by reading the following detailed description, taken together with the drawings wherein:

FIG. 5 is a called numbers screen; and

DETAILED DESCRIPTION OF THE PREFERRED EMBODIMENT

Figure 1:
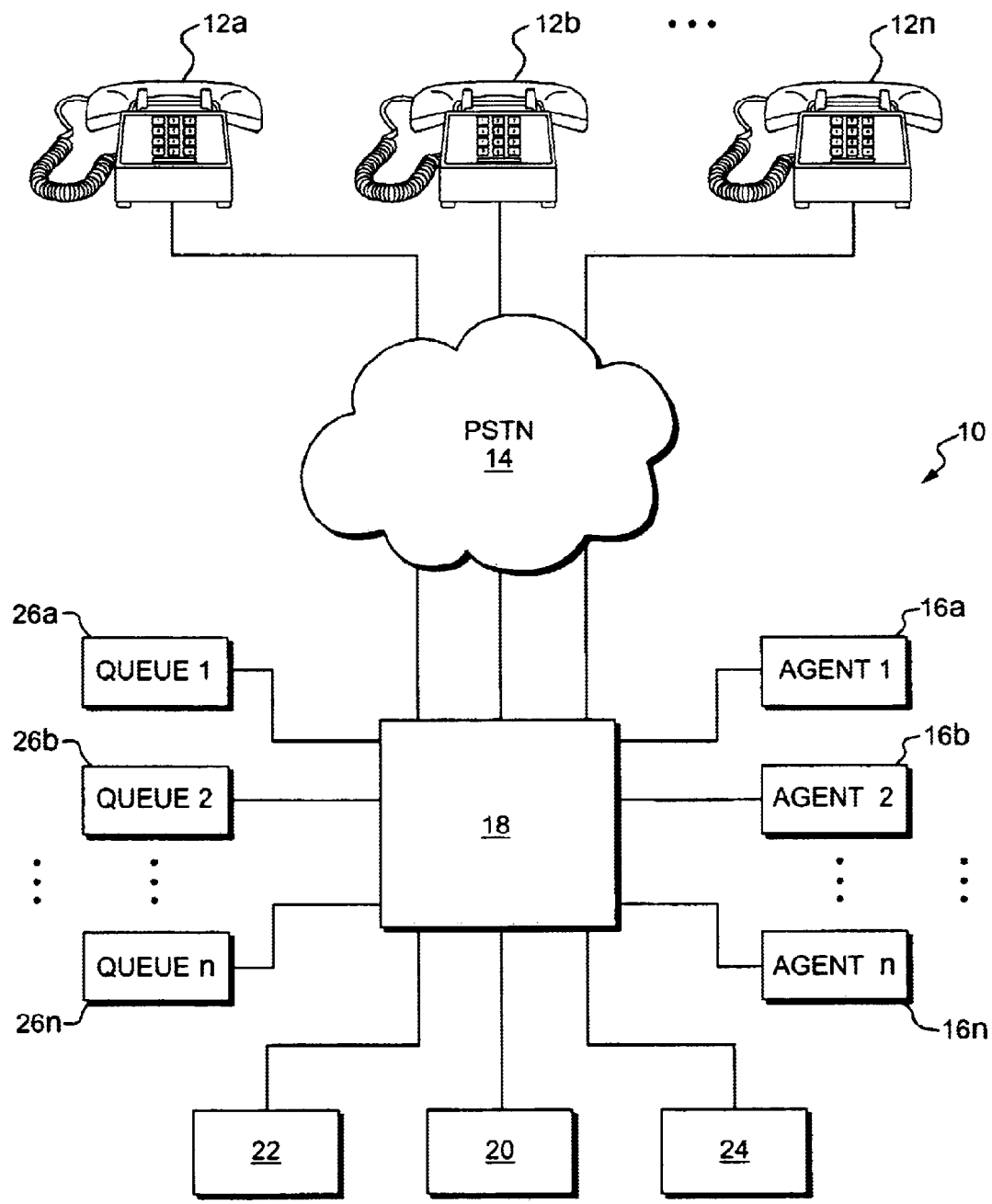
FIG. 1 is a block diagram of a typical, prior-art system for automatically handling incoming telephone calls.

Referring to the Figures and in particular, to FIG. 1, the various components of a typical, prior art automatic call distributor (ACD) system 10 are shown. The ACD 10 distributes incoming calls placed by callers 12, which it receives via public telephone network 14, to agent stations 16. The ACD 10 includes call router 18, voice response unit 20, database 22, management console 24 and a plurality of call holding queues 26. Call router 18 is used to connect an incoming call placed by caller 12 to one of the agent stations 16. Call router 18 selects the agent station 16 to receive a specific incoming call based upon user-selectable criteria, which is monitored by the system.

The user-selected criteria used to route incoming calls may include, for example, the telephone number called. In addition, supplemental information regarding a specific incoming call can be obtained using a voice response unit (VRU) 20 according to common call center techniques. For example, VRU 20 may present one or more queries to an incoming caller that may be responded to using DTMF tones generated by the caller's Touch Tone telephone. Examples of such queries include "push 1 for service, 2 for sales", etc. Of course, multi-tiered query hierarchies can be used to precisely identify or categorize the exact nature of an incoming call.

Based on the system-recognizable attributes of the incoming call, call router 18 will then direct the call to an appropriate agent 16. For example, certain agents may be designated as service agents, since they have greater technical capabilities, while other agents may be designated as sales agents. Other typical agent qualifications involve language proficiency and the like.

In any event, if an appropriate agent is not available to handle an incoming call, then the call will be routed by call router 18 to an appropriate queue 26 where it will remain on hold until an appropriate agent becomes available or the call is otherwise disposed of.

While the basic system operation discussed above is well-known to those skilled in the art of automatic call distributor systems, the present invention departs from these well-known principles in its novel system and method of generating and modifying call treatments.

Figure 2:
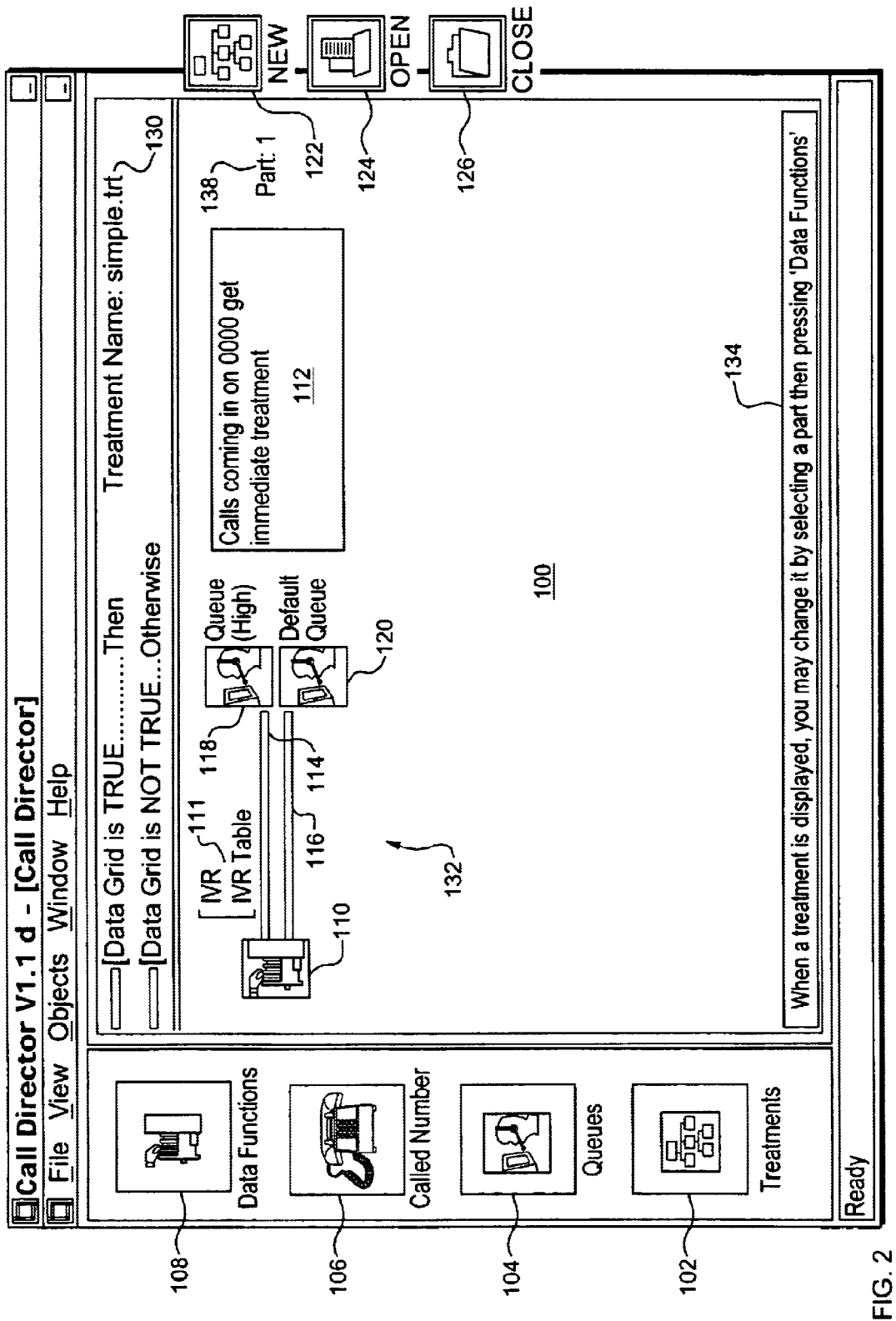
FIG. 2 is an ACD system user display according to one embodiment of the present invention showing a graphical representation of a simple call treatment and the graphical user interface icons associated with creating and modifying call treatments.

FIG. 2 shows a graphical user interface configured to manipulate a call treatment according to one embodiment of the present invention, which is displayed on a call center management console 24. The display shown is a treatment screen 100, which is displaying a simple, sample call treatment in a graphical format. Displayed in a vertical column at the left side of the call treatment screen 100 are a plurality of user selectable function icons, including treatments icon 102, queues icon 104, called number icon 106, and data functions icon 108.

In the example shown in FIG. 2, the treatments function icon 102 has been selected. This selection presents additional function specific icons unique to the call treatment function. The call treatment function specific icons include the "start a new treatment" icon 122, "open an existing treatment for editing" icon 124, and "close the current treatment" icon 126.

In the example shown, a graphical representation of call treatment 132 is displayed on treatment screen 100. As indicated in the treatment name line 130, which is displayed at the upper right hand corner of treatment screen 100, the displayed example treatment is named "simple.trt." This sample treatment 132 simply directs all incoming telephone calls that have dialed the 0000 extension to a high priority queue (queue 1) 118 for immediate handling. All other incoming calls are directed to a default queue (queue 2) 120.

The graphical representation of the sample treatment 132 includes a data functions icon 110, which indicates in its associated text display 111 that the data relevant to the particular decision being made by the sample treatment 132 comes from the IVR database and, in particular, from the IVR table. A decision description display window 112 provides a textual description of the decision being made by the call treatment. In this case, the decision description window 112 indicates that the sample treatment monitors the incoming telephone number dialed by the caller to determine whether or not the 0000 extension has been called.

Data grid flow paths 114 and 116 are shown graphically and depict the flow of an incoming telephone call after the treatment decision is applied. In this case, the data grid true flow path 114 indicates that an incoming telephone call to the 0000 extension is routed to queue 1 118, for immediate handling. On the other hand, the data grid not-true flow path 116 indicates that all other incoming calls will be routed to a default queue 120. To facilitate user recognition, the true and not-true flow paths may be graphically represented using a color-coding scheme, such as "green" for true and "red" for not-true flow paths.

A user assistance window 134 is provided at the bottom of treatment screen 100 and displays useful information to a system user. In the example of FIG. 2, the user assistance window displays, "when a treatment is displayed, you may change it by selecting a part then pressing 'Data Functions'." Finally, a treatment part indicator 138 is provided adjacent to each part of a particular treatment. A "part" is a distinct decision step that is made by the treatment. In the example of FIG. 2, part indicator 138 shows that the simple, single part treatment contains only part 1. However, as can be appreciated, multi-part treatments will take more advantage of this feature.

Figure 3:
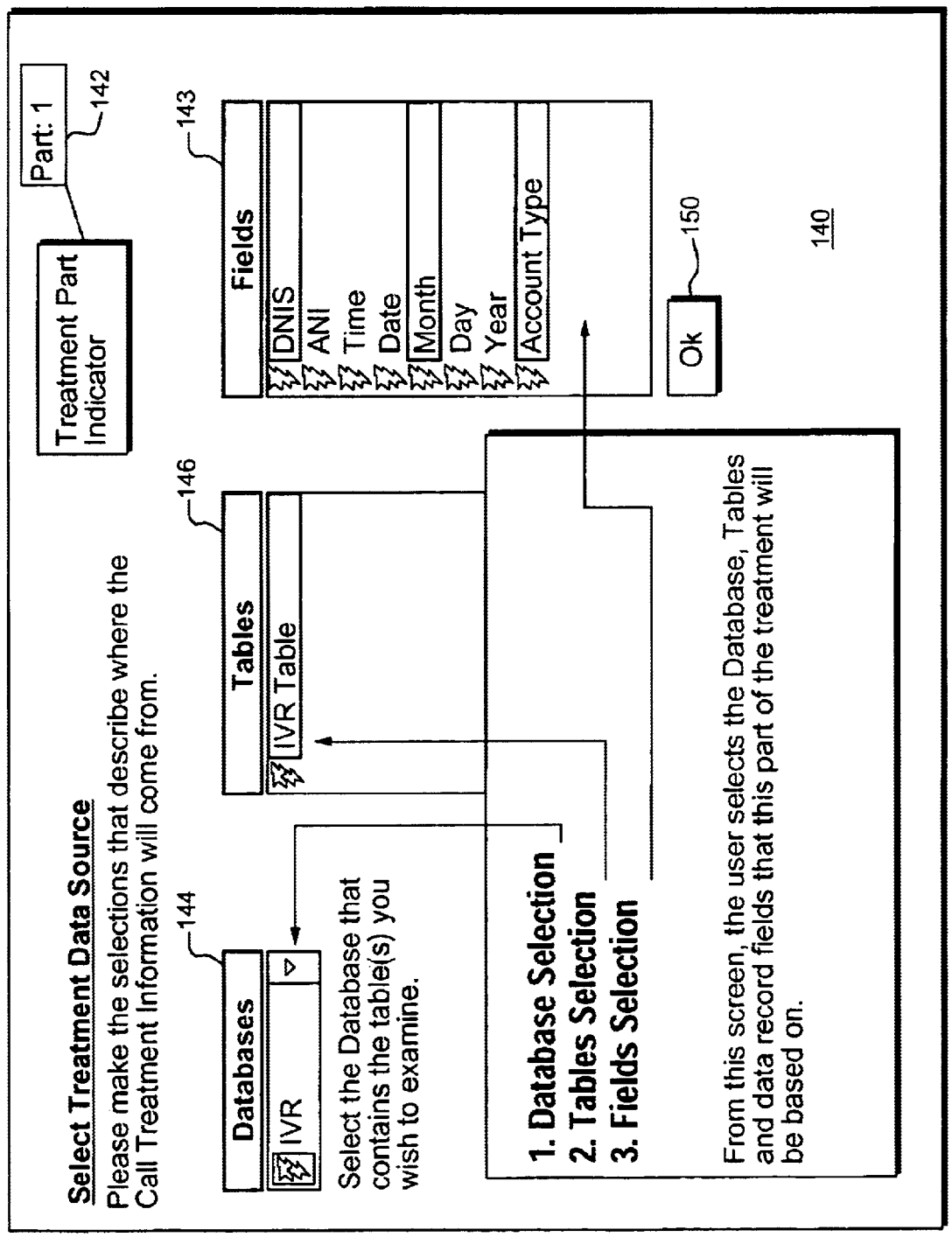
FIG. 3 shows a first data functions computer screen, where data fields from which call treatment information will come are selected.

FIG. 3 shows a first data function screen 140. In this example, part 1 of the treatment is displayed. The part being displayed can be easily identified by the treatment part indicator 142, which appears in the upper right corner of data functions screen 140. As can be seen, the first data functions screen 140 is a select data source screen, which is used by a user to select at least one data record field containing data upon which a treatment decision or "part" will be based. In the example at FIG. 3, a three tiered data source hierarchy is shown and includes "Databases", "Tables" and "Data Record Fields" in a hierarchical fashion. In other words, Tables are subsets of Databases and Data Record Fields are subsets of Tables. The data base is selected from database selection window 144. According to standard windows conventions, the database selection window may be a pull down window capable of displaying a plurality of databases from which table selection criteria may be selected.

When a database is selected in database selection window 144, the data tables associated with the selected database will be displaced in data tables selection window 146. In the example of FIG. 3, the IVR database is selected, which dictates that the only IVR table is available for selection. Of course, other databases may have multiple data tables available for selection.

Also included on data functions screen 140 is fields selection window 148, which displays the available data record fields upon which the treatment decision may be based. The system user simply selects those data record fields of interest to the treatment decision. Once the select data source section of the treatment part is completed, which is indicated by a click on the "OK" icon 150 on the selected data source screen 140, a second data functions screen 160 is displayed on the call center management console. The second data functions screen 160 is a specify field criterion screen, which allows "if-then-otherwise" tests based upon the data contained in the data record fields selected using the selected data sources screen 140 (FIG. 3) to be created and modified.

Figure 4:
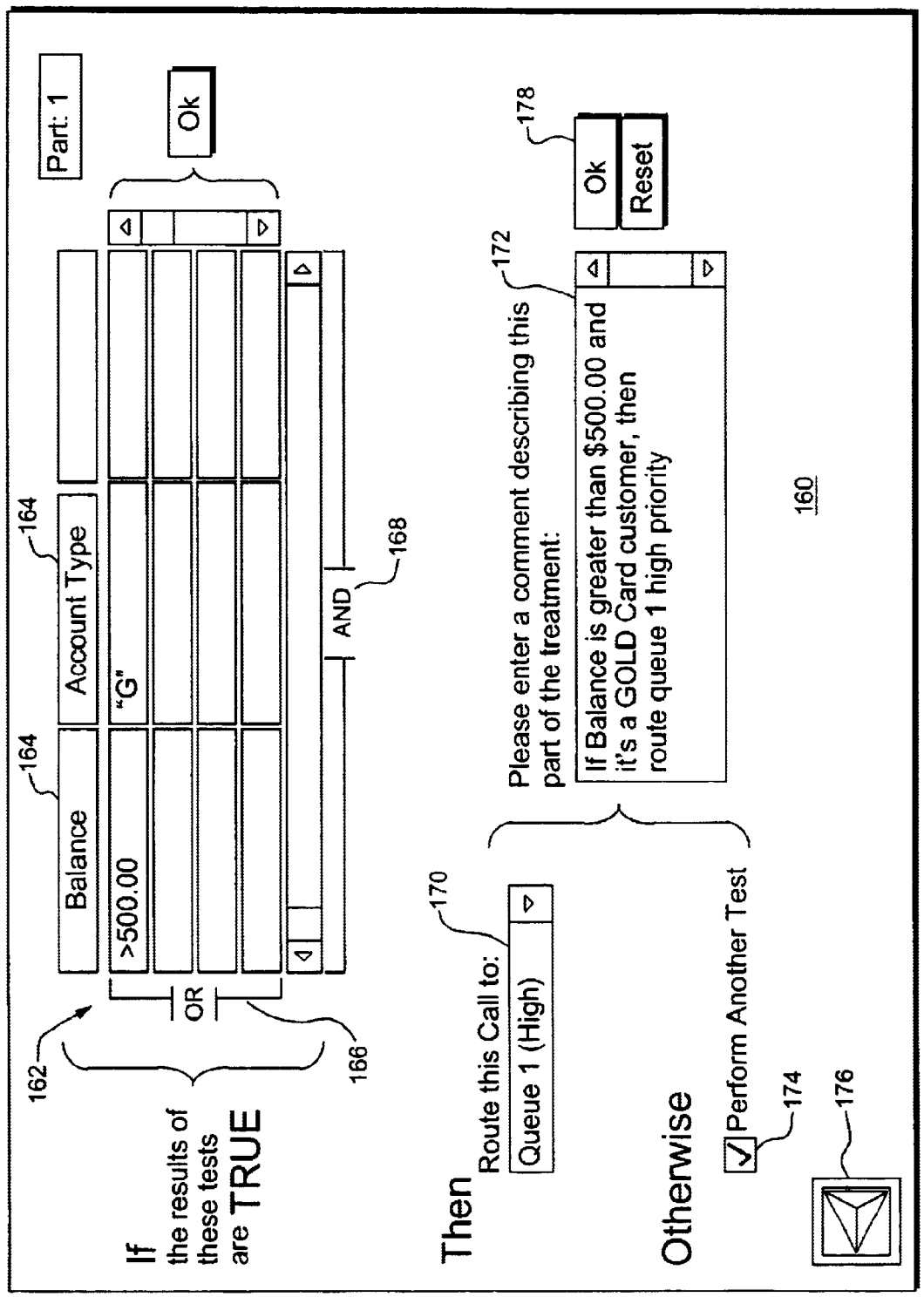
FIG. 4 is a second data functions screen, which allows tests associated with data field contents to be created or modified.

The first section of the specify field criterion screen 160 is a satisfy condition matrix 162. At the top of the matrix 162, the applicable data record fields 164 selected in the previous step are displayed. The layout of the matrix 162 allows the contents of at least one data record field to satisfy one or more "if-then-otherwise" test. These are displayed as "or" conditions, which are displayed in the matrix columns 166. "And" conditions are represented using the rows 168 of matrix 162. This allows the flexibility to design simple or complex treatment decisions. In the example of FIG. 4, the graphical representation provides the following "and" test: "if the value of the "balance" data record field is greater than $500.00 and the value in the "account type" data record field is a "G" then the field criterion test will be satisfied.

The call routing associated with a satisfied field criterion test is provided in the "then" window 170. The then window 170 also, according to standard windows conventions, provides a pull down-type window from which the various alternatives call routes can be selected. Also provided on specify field criterion screen 160 is decision description window 172, where a user can input a textual message describing the treatment decision of the particular part of the call treatment. The textual description entered into decision description window 172 will ultimately be displayed on a call treatment screen 100 (FIG. 2) in its decision description display window 112.

If none of the field criterion tests are satisfied, then the "otherwise" condition is satisfied. In this case, another test may be created by checking the "perform another test" checkbox 174. A previous screen icon 177 is also included on specified field criterion screen 160, which allows a system user to return to the select data source screen 140 (FIG. 3) should modifications to the selected data record fields be required.

If the perform another test check box 174 is selected, then selecting the "OK" icon 178 will result in the presentation of a new select data source screen to the system user, which will be used to select data record fields applicable to a second and subsequent parts of the call treatment. On the other hand, if the perform another test check box 174 is not selected, then any calls not satisfying any part of the field criterion tests will be routed to a default queue.

Any call treatment displayed on a call treatment screen can be edited or modified by a user by simply selecting the graphical representation of the pertinent part displayed on the call treatment screen. Once a part is selected, changes can be made by returning to the data functions screen using the data functions icon 108 (FIG. 2).

Figure 6:
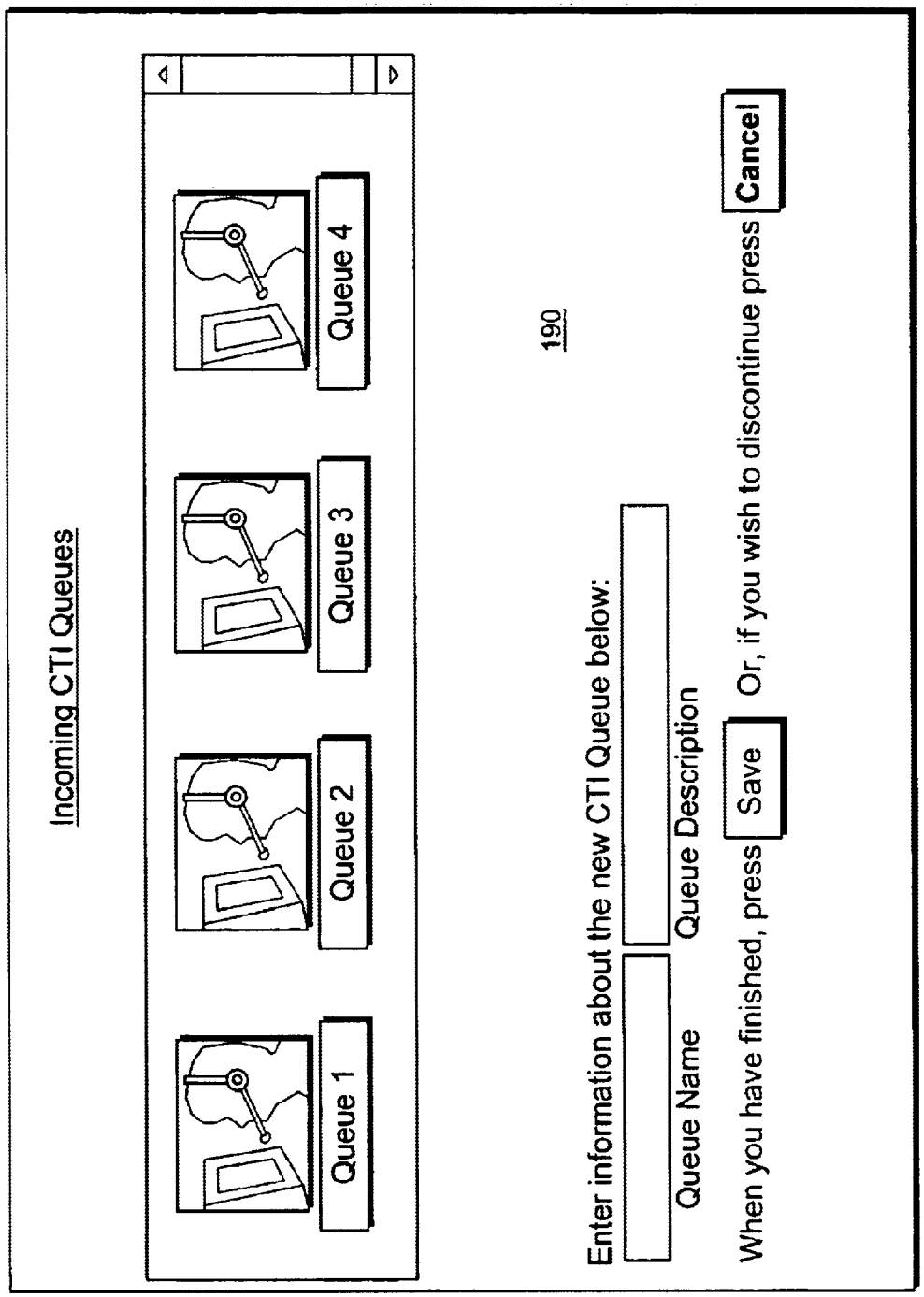
FIG. 6 is a CTI queues screen.

Also provided are call numbers screen 180 (FIG. 5) and CTI queues screen 190 (FIG. 6). Calls numbers screen 180 provides a list of those telephone numbers which may be called by a calling party that are routed to the ACD system over the public telephone network. Each called number in is listed including the complete called number and abbreviation and a brief description of each called number.

The CTI queues screen 190 (FIG. 6) includes information about the various queues available to the ACD system. A new queue may be added by entering a queue name, a queue description and pressing the save icon.

Modifications and substitutions by one of ordinary skill in the art are considered to be within the scope of the present invention which is not to be limited except by the claims which follow.

What is claimed is:

1. A method to enable a user to dynamically program call treatments for incoming calls comprising the steps of:
   providing a graphical user interface for selecting from a plurality of call treatment programming options, including at least dynamically creating a new call treatment and dynamically modifying an existing call treatment;
   providing a graphical user interface for selecting a data field from among a plurality of data fields that contain data related to the incoming calls;
   providing a graphical user interface for dynamically defining a test utilizing the data in the data field, wherein the test has at least two possible test results; and
   for assigning a call disposition selection based upon the test result.

2. The method of claim 1, further comprising the step of generating a graphical representation of a programmed call treatment comprising a data field icon representative of each data field tested in the call treatment, a call disposition icon representative of each possible call disposition selected for a call treatment, and a graphical representation of at least two possible test results as a pathway between the data field icon and at least two call disposition icons, one for each said at least two possible test results.

3. The method of claim 1, wherein the step of providing a graphical user interface for selecting a data field from among a plurality of data fields comprises the step of providing a graphical user interface representative of the structure of the databases from which the data fields may be selected.

4. The method of claim 1, wherein the step of providing a graphical user interface for defining a test for the data in the data field comprises providing a graphical user interface comprising a satisfy condition matrix.

5. The method of claim 4, wherein the step of providing a graphical user interface for defining a test for the data in the data field further comprises providing a list of possible call disposition from which a call disposition can be selected if the test condition is satisfied.

6. The method of claim 4, wherein the step of providing a graphical user interface for defining a test for the data in the data field further comprises providing an option to apply another test if the test condition is not satisfied.

7. The method of claim 1, wherein the step of providing a graphical user interface for defining a test for the data in the data field comprises the step of providing a description window for the user to enter a textual description of the test and the possible call disposition selections.

8. A system to enable a user to dynamically program call treatments for incoming calls comprising:
   a graphical user interface, for allowing a user to select from a plurality of call treatment programming options, including at least dynamically creating a new call treatment and dynamically modifying an existing call treatment;
   a graphical user interface, for allowing a user to select a data field from among a plurality of data fields that contain data related to the incoming calls;
   a graphical user interface, for allowing a user to dynamically define a test for the data in the data field, wherein the test has at least two possible test results;
   a graphical user interface, for allowing a user to assign a call disposition to each possible test result.

9. The system of claim 8, further comprising a graphical representation of a programmed call treatment comprising a data field icon representative of each data field tested in the call treatment, a call disposition icon for each possible test result representative of each possible call disposition, and a graphical representation of the test results as a pathway between the data field icon and the call disposition icons for each of the said two possible test results.

10. The system of claim 8, wherein the graphical user interface for selecting a data field from among a plurality of data fields comprises a graphical user interface representative of the structure of the databases from which the data fields may be selected.

11. The system of claim 8, wherein the graphical user interface for defining a test for the data in the data field comprises a graphical user interface comprising a satisfy condition matrix.

12. The system of claim 11, wherein the graphical user interface for defining a test for the data in the data field further comprises a list of possible call disposition selections from which a call dispostion can be selected if the test condition is satisfied.

13. The system of claim 11, wherein the graphical user interface for defining a test for the data in the data field further comprises an option to apply another test if the test condition is not satisfied.

14. The system of claim 8, wherein the graphical user interface for defining a test for the data in the data field comprises a description window for the user to enter a textual description of the test and the possible call treatment selections.

* * * * *